(12) United States Patent
Vladuchick et al.

(10) Patent No.: US 10,121,619 B2
(45) Date of Patent: Nov. 6, 2018

(54) CIRCUIT BREAKER SYSTEM WITH HEATING RADIATOR AND PARTICLE TRAP

(71) Applicant: ABB Schweiz AG, Baden (CH)

(72) Inventors: Paul Vladuchick, Cranberry Township, PA (US); Matt D. Cuppett, Uniontown, PA (US); Beth L. Dahm, Sewickley, PA (US); Jared P. Johnston, Greensburg, PA (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/265,497

(22) Filed: Sep. 14, 2016

(65) Prior Publication Data

US 2018/0075990 A1    Mar. 15, 2018

(51) Int. Cl.
| | |
|---|---|
| *H01H 33/56* | (2006.01) |
| *H01H 33/22* | (2006.01) |
| *H01H 33/64* | (2006.01) |
| *H01H 33/76* | (2006.01) |

(52) U.S. Cl.
CPC .......... *H01H 33/563* (2013.01); *H01H 33/22* (2013.01); *H01H 33/64* (2013.01); *H01H 33/765* (2013.01)

(58) Field of Classification Search
CPC ...... H01H 33/22; H01H 33/563; H01H 33/64; H01H 33/56; H01H 33/562; H01H 33/765; H02B 1/56; H02B 13/055
USPC .......... 218/155, 12, 13, 37, 57, 85; 219/201; 200/148 E
See application file for complete search history.

(56) References Cited

U.S. PATENT DOCUMENTS

| | | | | |
|---|---|---|---|---|
| 3,358,104 | A * | 12/1967 | Cromer | H01H 33/562 174/139 |
| 3,566,062 | A * | 2/1971 | Meier | H01H 33/562 218/71 |
| 4,024,365 | A * | 5/1977 | Soles | H01H 33/56 218/4 |
| 4,088,826 | A | 5/1978 | Bolin | |

(Continued)

FOREIGN PATENT DOCUMENTS

FR    2733637  A1 *  10/1996  .............. H02B 1/56

OTHER PUBLICATIONS

Translation FR2733637 (Original document published Oct. 31, 1996).*

*Primary Examiner* — Renee Luebke
*Assistant Examiner* — William Bolton
(74) *Attorney, Agent, or Firm* — J. Bruce Schelkopf; Taft Stettinius & Hollister LLP (57) ABSTRACT

A circuit breaker system has an SF6 tank having a wall, and an SF6 heating system. The SF6 heating system includes a heater disposed externally of the tank, and a radiator disposed on the wall inside the SF6 tank. The radiator is thermally coupled to the heater via the wall. The heating system is constructed to conduct heat from the heater through the wall to the radiator. The radiator is constructed to radiate the heat to the SF6 in the tank. A circuit breaker system has an SF6 tank having a wall, and a particle trap. The particle trap has a spar extending radially inward from the wall and a wing extending outward from each side of the spar. Each wing is spaced apart from the wall and forms a region having no electric field at the bottom of the tank adjacent the spar.

20 Claims, 3 Drawing Sheets

(56) References Cited

U.S. PATENT DOCUMENTS

| | | | |
|---|---|---|---|
| 4,434,335 A * | 2/1984 | Natsui | H01H 33/562 218/83 |
| 6,147,333 A * | 11/2000 | Mattson | H01H 33/562 219/531 |
| 6,307,172 B1 | 10/2001 | Bolin et al. | |
| 7,102,101 B1 | 9/2006 | Johnson et al. | |
| 7,858,877 B2 | 12/2010 | Nowakowski et al. | |
| 2009/0147435 A1 | 6/2009 | Krause et al. | |
| 2011/0180514 A1 | 7/2011 | Jin | |

\* cited by examiner

CIRCUIT BREAKER SYSTEM WITH HEATING RADIATOR AND PARTICLE TRAP

TECHNICAL FIELD

The present application generally relates to circuit breaker systems, and more particularly, but not exclusively, to a circuit breaker system having a combined heating radiator and particle trap.

BACKGROUND

Electrical systems of various types, e.g., circuit breaker systems, remain an area of interest. Some existing systems have various shortcomings, drawbacks and disadvantages relative to certain applications. For example, in some circuit breaker systems, improvements in sulfur hexafluoride (SF6) heating and particle trapping may be made. Accordingly, there remains a need for further contributions in this area of technology.

SUMMARY

One embodiment of the present invention is a unique SF6 insulated circuit breaker system having a heating radiator. Another embodiment is a unique SF6 insulated circuit breaker system having a particle trap. Another embodiment is a unique SF6 insulated circuit breaker system having a combination radiator and particle trap. Other embodiments include apparatuses, systems, devices, hardware, methods, and combinations for circuit breaker systems. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
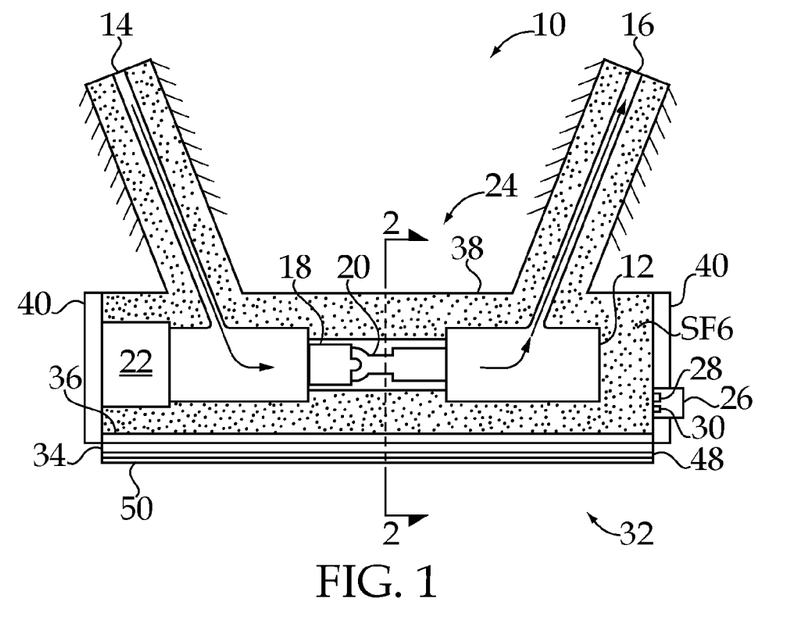
FIG. 1 schematically illustrates some aspects of a non-limiting example of a sulfur hexafluoride (SF6) insulated circuit breaker system in accordance with an embodiment of the present invention.
Figure 2:
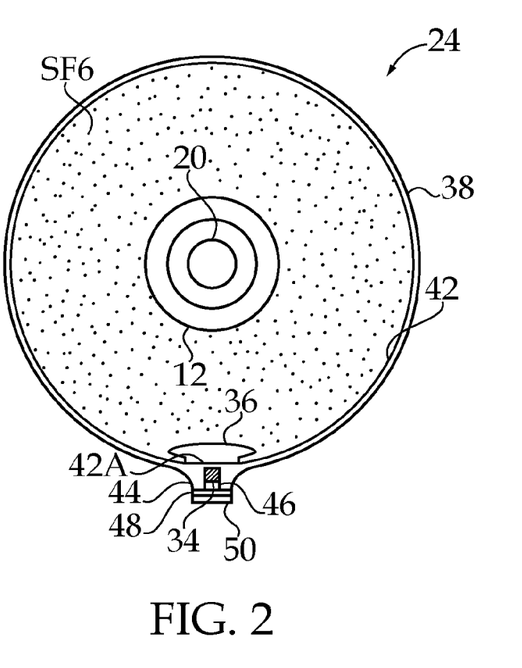
FIG. 2 schematically illustrates some aspects of a non-limiting example of the SF6 insulated circuit breaker system of FIG. 1 in accordance with an embodiment of the present invention.

Referring to FIGS. 1 and 2, some aspects of a non-limiting example of a sulfur hexafluoride (SF6) insulated circuit breaker system 10 in accordance with an embodiment of the present invention are schematically illustrated. In one form, circuit breaker system 10 employs an SF6 dielectric gas puffer system to force pressurized SF6 between the circuit breaker contacts during circuit interruption (opening of the contacts). In other embodiments, circuit breaker system 10 may employ any suitable SF6 arc quenching system, e.g., circuit breaker system 10 may be a self-blast system. Circuit breaker system 10 includes an interrupter or circuit breaker 12 having conductors 14 and 16; contacts 18 and 20 and a system 22 for operating contacts 18 and 20; a tank 24 constructed as a reservoir to hold a quantity of SF6; a density monitor 26 including a temperature sensor 28 and a pressure sensor 30; and a heating system 32.

Contacts 18 and 20 are operated by mechanical system 22 to selectively make and break electrical current paths to respectively allow and interrupt current flow through conductors 14 and 16. Contacts 18 and 20 are insulated by SF6 from tank 24 for arc quenching. In one form, contacts 18 are double motion contacts. In other embodiments, single motion contacts may be employed. Tank 24 is constructed to hold a quantity of SF6, and to act as a reservoir for the SF6. In the illustrated embodiment, contacts 18 and 20 are disposed within tank 24. In other embodiments, contacts 18 and 20 may be located outside of tank 24, and may be supplied with SF6 from tank 24.

Density monitor 26 is operative to determine and monitor the density of the SF6 gas in tank 24. Under normal conditions, SF6 functions as an electrical insulator, an interrupting media to quench arcing, and a mechanical damper for contacts 18 and 20 in circuit breaker 12. The SF6 is stored in tank 24 under pressure at typical most typical ambient temperatures. Under some conditions of low temperature, e.g., from –30° C. to –50° C. or lower, the SF6 gas in tank 24 can experience liquefaction, wherein some of the SF6 gas becomes a liquid. Liquefaction of some of the SF6 gas reduces the density of the remaining unliquefied gaseous SF6 in the tank that is used for quench arcing, e.g., during the opening of contacts 18 and 20. In one form, density monitor 26 employs temperature mechanism or sensor 28 and a pressure mechanism or sensor 30 to determine and/or act on the density of the SF6 gas in tank 24.

Density monitor 26 is operative to indicate a state associated with the density of the SF6 gas in tank 24, which varies with the temperature of the SF6 gas in tank 24. If the SF6 gas in tank 24 has sufficient density for normal arc quenching operation without undue damage to contacts 18, density monitor 26 outputs no signal, which is indicative of a nominal state, or outputs a signal indicating a nominal state, depending upon the embodiment. If the SF6 gas density is lower than a first predetermined density level, density monitor 26 outputs a signal indicating an alarm state, e.g., to indicate that operating conditions are less than optimal, or to provide a status warning to the operator of circuit breaker system 10 or to indicate to the operator of circuit breaker system 10 that service is required, e.g., to investigate the cause of the alarm state, or to supply heat to tank 24, or to indicate the need to replenish the supply of SF6 in tank 24 or take other measures to increase the density of the SF6 in tank 24. If the SF6 gas density drops to a second predetermined density level below that associated with the alarm state, density monitor 26 outputs a signal representing a lockout state. In one form, the lockout state occurs when the SF6 temperature is −33° C., i.e., the lockout temperature of the SF6 is −33° C. In other embodiments, other temperatures may be used to designate a lockout state.

The density levels associated with the nominal state, the alarm state and the lockout state may vary with the needs of the particular application, and are known to those skilled in the art. In some embodiments, when in the lockout state, circuit breaker system 10 allows a single occurrence of a circuit interruption, i.e., allows contacts 18 and 20 to be opened a single time, but does not allow contacts 18 and 20 to be closed or subsequently closed, or does not allow charging of springs, pistons or other devices used to close contacts 18 and 20 until reset of the lockout state. In some embodiments, once in the lockout state, circuit breaker system 10 does not allow either opening or closing of contacts 18 and 20 until reset of the lockout state.

Heating system 32 is operative to heat the SF6 in tank 24 to prevent, reduce or reverse liquefaction of the SF6 in tank 24. Heating system 32 includes a heater 34 and a radiator 36. Radiator 36 is disposed at the bottom of tank 24. Tank 24 includes a central shell 38 having a length extending between two end portions 40. In one form, shell 38 has a predominantly cylindrical shape. In other embodiments, shell 38 may have other geometries. Shell 38 includes a wall 42 extending around the periphery of and defining shell 38. Wall 42 is operative to contain the SF6. Wall 42 may vary in thickness and radial distance from circuit breaker 12 at different locations about shell 38.

Some circuit breaker system configurations may experience problems stemming from particle contamination, e.g., conductive or semi-conductive particles disposed in the vicinity of the circuit breaker, such as in the tank that houses the SF6 and the circuit breaker. The particles may be formed, for example, during the manufacture and/or assembly of components of the circuit breaker system, and despite rigorous cleaning procedures, some particles may remain in the circuit breaker system. In addition, some particles may be formed during the operation of the circuit breaker system, e.g., wear between moving parts. Typically, particles migrate to the bottom of the tank under gravity and vibration, e.g., migration stemming from transportation, mechanical circuit breaker operation and 60 Hz power frequency. Once at the bottom of the tank, the particles may be levitated by electric fields and initiate a flashover. It is thus desirable to trap particles at the bottom of the tank and prevent them from levitating and forming a bridge or partial bridge to flashover. Accordingly, radiator 36 is constructed not only to radiate heat from heater 34 to the SF6 in tank 24, but is also constructed as a particle trap for trapping particles at the bottom of tank 24 by shielding particles at the bottom of the tank from electric fields that might otherwise undesirably levitate the particles. Radiator 36 may thus be referred to as particle trap 36 or radiator/particle trap 36.

Referring also to FIGS. 3A, 3B, 4A, 4B and 5, formed at the bottom of tank 24 is a spine 44 in the form of a boss extending lengthwise along the bottom of shell 38. In one form, spine 44 extends the length of shell 38. In other embodiments, spine 44 may be shorter. Spine 44 includes therein a downward-facing opening or slot 46 extending lengthwise along the length of spine 44. Heater 34 is disposed in slot 46, and extends the length of spine 44 and slot 46. In various embodiments, heater 34 may be formed of one or more heating elements. The type of heater may vary in different embodiments. For example, in the embodiment of FIGS. 3A and 4A, a cartridge heater 34A is employed, whereas in the embodiment of FIGS. 3B and 4B, a strip heater 34B is employed. In other embodiments, other types of heaters may be employed, e.g., ribbon heaters. The geometry of spine 44 and slot 46 may vary with the needs of the particular application, e.g., based on the type of heater employed. An insulation strip 48 covers slot 46. Insulation strip 48 is a thermal insulation layer constructed to reduce heat loss to the external environment from heater 34. A cover strip 50 attached to spine 44 covers and provides protection for insulation strip 48 and heater 34. In various embodiments, cover strip 50 maybe metallic or nonmetallic. In some embodiments, additional insulation may be employed, e.g., covering all or a part of spine 44 and/or the balance of tank 24.

Figures 3A, 3B:
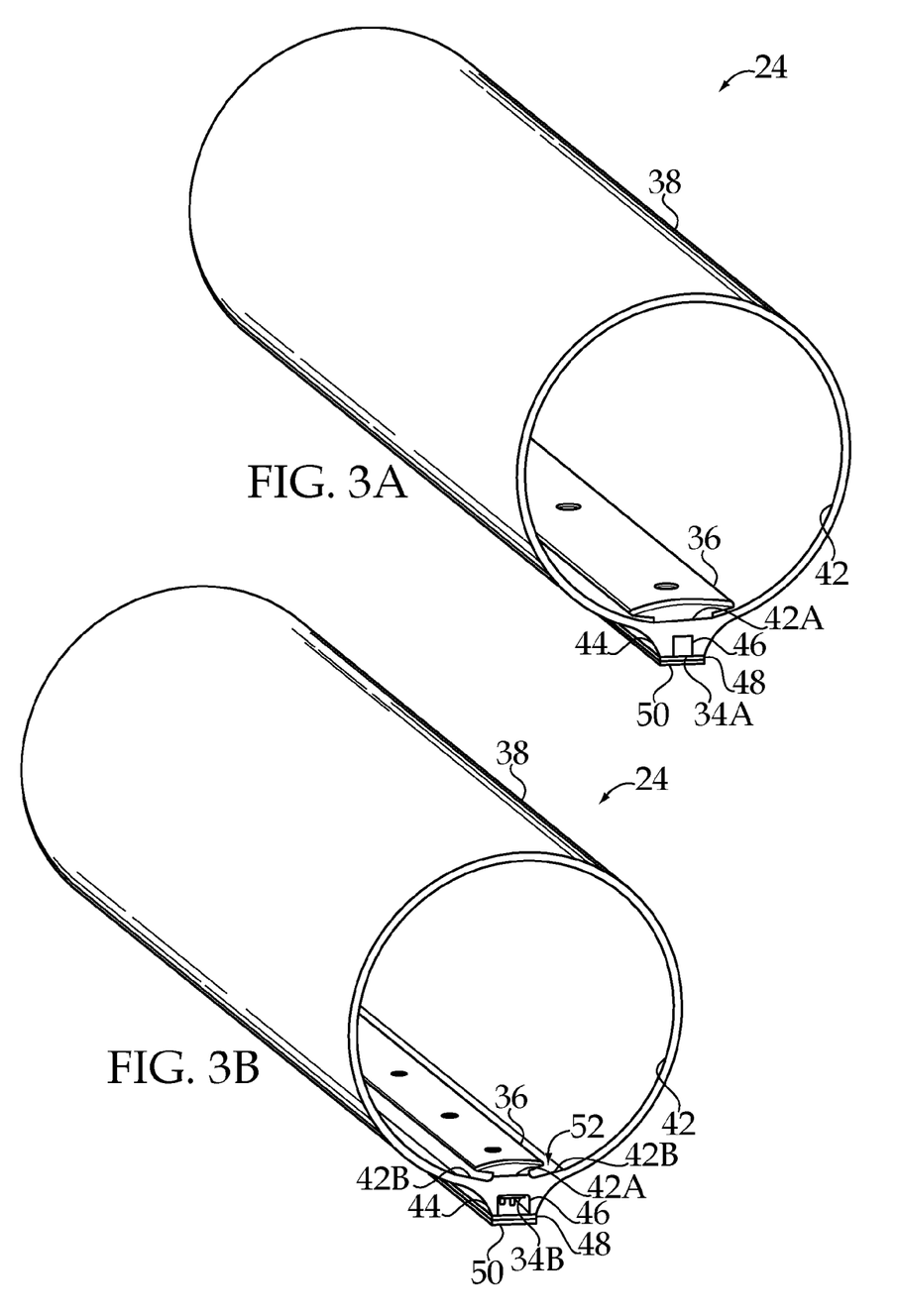
FIGS. 3A and 3B illustrate isometric views of some aspects of non-limiting examples of SF6 tanks having a combination SF6 heating radiator and particle trap in accordance with an embodiment of the present invention.
Figure 4A:
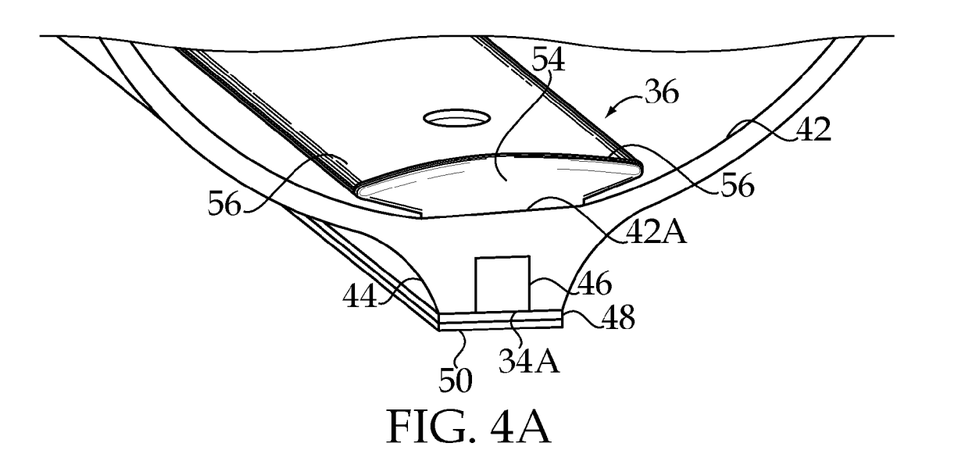
FIGS. 4A and 4B illustrate enlarged views of the respective embodiments of FIGS. 3A and 3B.
Figure 4B:
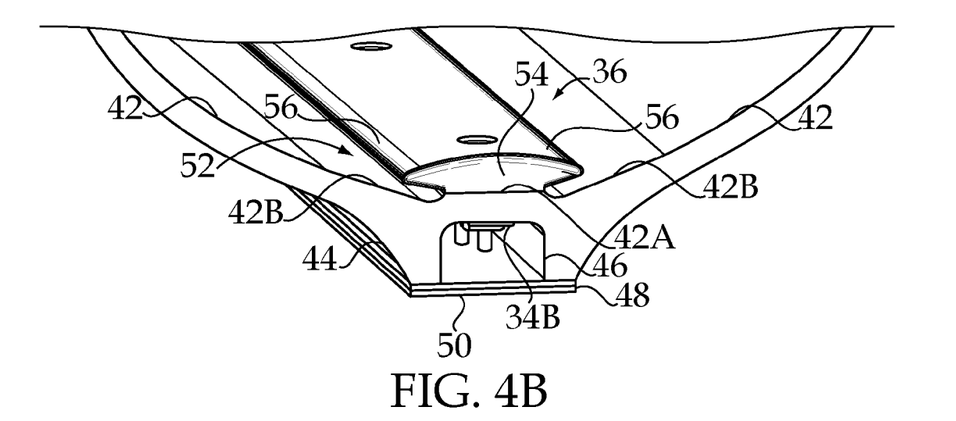

Radiator 36 has a flat bottom and is mounted inside tank 24 on an internal surface of a flat wall portion 42A of the otherwise generally cylindrical wall 42 at the bottom of tank 24. In the embodiment of FIGS. 3A and 4A, flat wall portion 42A lies at the bottom of shell 38. In the embodiment of FIGS. 3B and 4B, wall 42 extends outward from circuit breaker 12 on both sides of the bottom area of shell 38, defining a particle well 52 at the bottom of shell 38 that extends radially outward of the balance of shell 38. For example, linear wall portions 42B of shell 38 extend tangentially from cylindrical portions of wall 42 to form particle well 52. In other embodiments, wall portions 42B may extend outward at greater angles, and may be curved and/or linear. In some embodiments having a particle well 52, flat wall portion 42A is raised up slightly from the bottom of particle well 52, e.g., as illustrated in FIGS. 3B and 4B. In the embodiment of FIGS. 3B and 4B, radiator 36 is disposed in particle well 52, mounted on wall 42A. Some embodiments may not employ a flat wall portion 42A, but rather may employ a radiator 36 having a contour that matches the contour of a cylindrical or other-shaped wall portion at the bottom of tank 24.

Radiator 36 is thermally coupled to heater 34 via wall 42, i.e., flat wall portion 42A, as illustrated in FIGS. 1, 2, 3A, 3B, 4A and 4B. Heater 34 is disposed in slot 46 and on the external side of wall 42A. In some embodiments, heater 34 is mounted on the external side of wall 42A. Radiator 36 is disposed inside tank 24 on the internal side of wall 42A opposite heater 34. Heater 34 is constructed to transfer heat to wall 42A, e.g., by conduction. Heating system 32 is constructed to conduct heat output by heater 34 through wall 42A to radiator 36. Radiator 36 is constructed to receive heat from heater 34 via wall 42A and to radiate the heat, e.g., in the form of infrared radiation, to heat the SF6, which absorbs infrared radiation. For example, in some embodiments, radiator 36 may be constructed to approximate a black body radiator. In various embodiments, radiator 36 may also conduct and convect heat received from heater 34 via wall 42A to the SF6. Any radiant heat not directly absorbed by the SF6 may be absorbed by wall 42 surrounding the SF6, which may transfer residual heat to the SF6 via conduction, convection and radiation.

In one form, radiator 36 is bolted to flat wall portion 42A. Some embodiments may employ blind threaded holes in flat portion 42A into which bolts or screws are threaded to attach radiator 36 to flat wall portion 42A. Other embodiments may employs studs that are welded or otherwise affixed to flat wall portion 42A, with nuts that are threaded thereon to attach radiator 36 to flat wall portion 42A. In still other embodiments, radiator 36 may be attached by other means, e.g., bonding. In some embodiments, a thermal paste or grease may be employed between the heater and flat wall portion 42A, and/or between radiator 36 and flat wall portion 42A in order to increase thermal conductance for heat transfer from heater 34 to radiator 36. Some embodiments may employ other means to increase thermal conductance from heater 34 to radiator 36.

Because heater 34 is external to tank 24, heater 34 is readily accessed for service or replacement, and does not require seals or sealing weld interfaces between the heater and the tank or between a heater-containing structure and the tank as would otherwise be required if the heater was installed in the tank or installed inside another structure that was disposed inside the tank. In configurations having such seals or sealing weld interfaces, servicing/replacement of the heater may damage the seals or sealing weld interfaces, which may result in an undesirable leak of the SF6. Embodiments of the present invention avoid such risks by eliminating the need for seals or sealing welds related to the heater or a heater containing structure disposed in the tank by placing the heater outside the tank and transmitting heat from the heater to the internal radiator via wall 42A.

Figure 5:
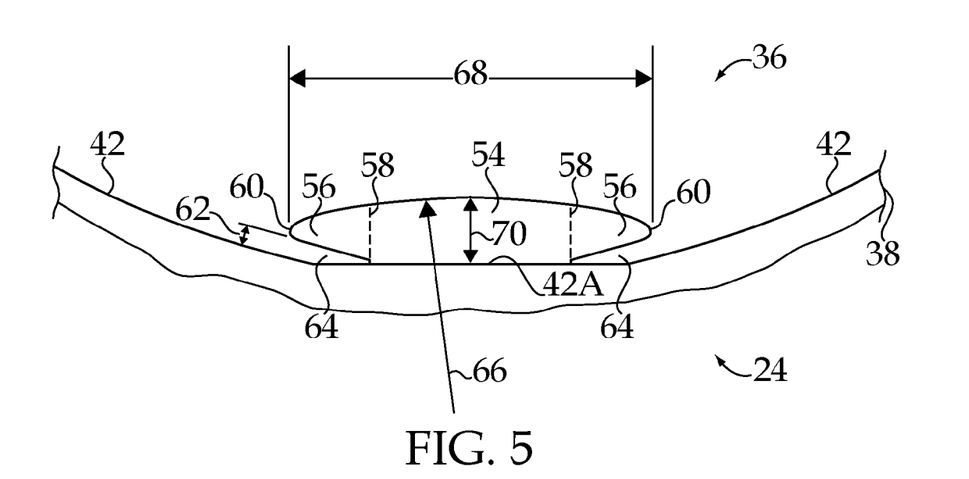
FIG. 5 illustrates some aspects of a non-limiting example of a combination SF6 heating radiator and particle trap in accordance with an embodiment of the present invention.

Radiator 36 includes a central spar 54 and two wings 56. In one form, radiator 36 (spar 54 and wings 56) has a length corresponding to the length or substantially to the length of shell 38. In other embodiments, radiator 36 may have a length that is substantially less than the length of shell 38. In some embodiments, a plurality of radiators 36 may be disposed along the length of shell 38. In such embodiments, a plurality of corresponding heaters may be disposed opposite wall 42A of the radiators.

Spar 54 extends radially inward from wall 42A. Wings 56 have a span or length extending from each side of spar 54 from a wing root portion or root 58 disposed adjacent to spar 54 and culminating in a wing tip portion or tip 60 spaced apart from spar 54. In one form, wings 56 extend approximately horizontally from spar 54. In other embodiments, wings 56 may extend from spar 54 at some other suitable angle. In one form, wings 56 and spar 54 are integral. In other embodiments, wings 56 may be attached or affixed to spar 54. Wings 56 increase the surface area of radiator 36, i.e., the longer wings 56 are, the greater the surface area of radiator 36 for radiating heat to the SF6 in tank 24.

Radiator 36 is constructed to trap particles at the bottom of tank 24. For example, wings 56 are spaced apart from wall 42, 42A by a gap 62. In one form, gap 62 varies along the span or length of wings 56. For example, in the embodiment of FIGS. 3A, 3B and 5, which is configured for a tank 24 having a diameter of 600 mm, gap 62 varies from 6.4 mm at tip 60 to 1 mm at root 48. In other embodiments, the dimensions of gap 62 may vary with the needs of the particular application. In some embodiments, gap 62 may be constant along the length of wings 56. In one form, the span or length of wings 56 substantially exceeds the height of gap 62. For example, in the embodiment of FIGS. 3A, 3B and 5, the maximum gap 62 height is approximately 6.4 mm, whereas the span or length of wings 56 extending between root 58 and tip 60 is 24.5 mm.

Radiator 36 is formed of a nonmagnetic material or a material having low magnetic permeability. For example, in some embodiments, radiator 36 is black anodized aluminum. In other embodiments, radiator 36 may be formed of other materials, e.g., metallic materials that may or may not have a surface treatment configured to increase emissivity. In some embodiments, radiator 36 may be formed of a nonmetallic material. Radiator 36 is in electrical communication with tank 24, e.g., grounded to tank 24, and thus at the same electrical potential as tank 24. Each wing 56 thus produces a region 64 in the gap 62 between wings 56 and wall 42, 42A that is shielded from the electric field emanating from circuit breaker 12, i.e., a region with no electric field potential at the bottom of tank 24 between each wing 56 and the adjacent portion of wall 42, 42A. Region 84 is adjacent to spar 54, and extends outward from spar 54/root 58 toward tip 60, and in some embodiments extends to or beyond tip 60.

Because walls 42 of shell 38 slope downward toward regions 64, particles in tank 24 will tend to migrate downward and inward toward the bottom of tank 24 and regions 64 on either side of spar 54 under the impetus of gravity and vibration, e.g., as mentioned above. Once in region 64, the particles are shielded from the electric field emanating from circuit breaker 12, and hence are not susceptible to being levitated by the electric field to potentially cause a flashover. The particles are thus trapped at the bottom of tank 24 by radiator/particle trap 36. Spar 54 functions as a shield to prevent the flow of SF6 under radiator 36, e.g., flow that may occur due to the opening or closing of circuit breaker 12 contacts, which might otherwise entrain particles that are otherwise trapped in region 64 and direct the particles out of region 64 and into the electric field emanating from circuit breaker 12, resulting in a potential flashover hazard. For example, some puffer or self-blast or other circuit breaker types may discharge SF6 into tank 24 and/or suction SF6 from tank 24, either or both of which might generate a local flow of SF6. With a radiator or particle trap not having a spar 54 in contact with wall portion 42A, such a flow of SF6 may possibly result in some SF6 flowing under such a radiator, entraining and driving particles otherwise trapped under the radiator out of the shielded region and into unshielded portions of tank 24, resulting in a potential flashover hazard.

The top of radiator 36 is convex. The top of radiator 36 is defined by a radius 66. In one form, radius 66 is substantially larger than the width 68 of radiator 36 between wing tips 60. For example, in the embodiment of FIGS. 3A, 3B and 5, radius 66 is 200 mm, whereas width 68 is 109 mm. Radius 66 and width 68 may vary with the needs of the particular application. In various embodiments, one or more additional radii may form a transition between radius 66 and the radius that defines tip 60. In other embodiments, the top of radiator 36 may be defined by other shapes, e.g., a spline. In any event, the curvature of the top of radiator is substantially more gentle than a radius defined by the width of radiator 36. In one form, the width 68 of radiator 36 is substantially greater than the height 70 of radiator 36. For example, in the embodiment of FIGS. 3A, 3B and 5, width 68 is 109 mm, whereas height 70 is 20 mm.

The configuration of radiator 36 in different embodiments varies with the needs of the particular applications. Considerations include that the design should be dielectrically sound against flashovers to circuit breaker 12, and that the radiator is preferably easy to install into tank 24 or formed as part of tank 24. Preferably, radiator 36 effectively shields a large region of the bottom of tank 24 from the electric field emanating from circuit breaker 12. Wings 56 provide the shielded region, i.e., regions 64, the size of which may be varied by varying the span or length of wings 56, the length of radiator 36, and the size of gap 62. Considerations also include providing a significant surface area of radiator 36 with which to radiate heat to the SF6 in tank 24. For example, the radiator 36 illustrated in FIGS. 3A, 4A and 5 has a radiative surface area of 174.5 square inches. The radiative surface area may vary with the needs of the particular application. Considerations also include providing a large interface surface area between spar 54 and wall 42A to conduct heat from the externally mounted heaters 34 into radiator 36. In embodiments wherein radiator 36 is also a particle trap, radiator 36 is preferably nonmagnetic, or has low magnetic permeability, such as the magnetic permeability of 300 series austenitic stainless steel.

The shape, e.g., cross-sectional shape, of radiator/particle trap 36 may be determined using closed form equations known to those skilled in the art, alone or in conjunction with finite element modeling or other computer aided design/analysis/simulation techniques, e.g., which may provide temperature and equipotential plots/data as well as electric field intensity plots/data for the particular geometry of radiator 36. For example, a starting geometry may be determined based on various constraints, for example and without limitation, including physical size restrictions, desired heat flux and chosen limitations for allowable field intensities based on the voltage requirements for the particular circuit breaker system application. Closed form equations and/or finite element analysis/simulation may then be used to determine radiative heat transfer and electric field intensities, and a comparison to the allowable field intensity limits may then be performed. In some cases, geometry changes may then be implemented, and the process may be iterated to achieve a geometry having suitable heat transfer and field intensities.

Geometric considerations include selecting the shape of the top of the radiator to minimize electric field intensity and provide smooth lines of equipotential. A flat or concave top may yield low or moderate electric field intensities in the central portion of the top of the radiator, but may yield high field intensities at the edges of the radiator or wings, whereas a convex top having a relatively small radius may result in higher than desirable field intensities at the central portion of the top of the radiator. Higher field intensities increase the likelihood of particle levitation and flashover. By selecting the top radius of the radiator to provide acceptable field intensities, and by transitioning to smaller radii at the wing tips, acceptable field intensities may be achieved at both the wing tips and the top of the radiator.

The curvature at the top of the radiator helps particles that may land on top of the radiator to migrate off the radiator onto wall 42 and into shielded regions 64. By keeping the electric field intensity at the top of the radiator down, the likelihood of those particles being levitated is reduced. Also, the greater the height of the radiator, the greater the field intensity at the top of the radiator, hence the desirability of keeping the height of the radiator to lower values. In addition, the greater the height of the radiator, the greater the likelihood of flashover at any field intensity level, owing to closer proximity to the circuit breaker. The surface area of the radiator is selected to achieve the desired heat transfer from the radiator to the SF6. The span of the wings, extending from the root to the tip of the wings, increases radiative surface area, as well as increases the size of shielded regions 64. The wing thickness at the root is preferably greater than at the tip in order to provide a suitable heat conduction path to control or maximize heat flux density through the wings to maximize heat flow to the radiative surface area of the wings. For example, the wing thickness at roots 58 is approximately four (4) times the thickness of the wings about 2 mm inboard of tips 60 in the illustrated embodiments. Preferably, the distance between the wing tips is substantially greater than the radius defining the top of the radiator, e.g., approximately twice the distance between the wingtips in some embodiments. Preferably, in order to provide a large region at the bottom of the tank with no or essentially no field intensity, the wings extend from the spar at least twice the maximum gap between the wings and the tank wall. In some embodiments, the ratio may be much greater, e.g., as in the illustrated embodiment having a span/maximum gap ratio of about four (4). Preferably, the radiator/particle trap has a relatively low/wide profile, e.g., having a width at least twice the height of the radiator in some embodiments, three times the height in other embodiments, and greater ratios in other embodiments, such as the illustrated embodiment having a radiator with a width/height ratio of approximately 5.5.

Embodiments of the present invention include a sulfur hexafluoride (SF6) insulated circuit breaker system, comprising: a tank constructed to hold a quantity of SF6, the tank having a wall for containing the SF6; a circuit breaker having contacts insulated by the SF6; and an SF6 heating system having a heater and a radiator thermally coupled to the heater via the wall, the heater being disposed on the wall externally of the tank and the radiator being disposed on the wall inside the tank and opposite the heater, wherein the heating system is constructed to conduct heat from the heater through the wall to the radiator; and wherein the radiator is constructed to radiate heat received from the heater via the wall to the SF6 in the tank.

In a refinement, the radiator is constructed to trap particles at the bottom of the tank.

In another refinement, the radiator is in electrical communication with the tank and at the same potential as the tank.

In yet another refinement, the tank has two ends and a shell having a length extending between the two ends, and the radiator has a length corresponding substantially to the length of the shell.

In still another refinement, the radiator has a spar extending radially inward from the wall, and a wing extending from each side of the spar, each wing being spaced apart from the wall and forming a region having no electric field at the bottom of the tank adjacent to the spar and between the wing and the wall.

In yet still another refinement, each wing culminates in a tip; the top of the radiator is convex, and the top of the radiator is defined by a radius substantially larger than the distance between the tips.

In a further refinement, the radiator is disposed in a well formed at the bottom of the tank.

In a yet further refinement, the radiator is formed of a nonmagnetic metallic material or a metallic material having a low magnetic permeability.

In a still further refinement, the radiator is black anodized aluminum.

Embodiments of the present invention include a sulfur hexafluoride (SF6) insulated circuit breaker system, comprising: a tank constructed to hold a quantity of SF6, the tank having two ends and a shell having a length extending between the two ends, the shell having a wall for containing the SF6; a circuit breaker having contacts insulated by the SF6; and a particle trap mounted the wall, the particle trap having a spar extending radially inward from the wall and a wing extending outward from each side of the spar, each wing being spaced apart from the wall and forming a region having no electric field at the bottom of the tank adjacent the spar, wherein the particle trap has a length corresponding substantially to the length of the shell; and wherein the particle trap is constructed to trap particles at the bottom of the tank to prevent flashover with the circuit breaker.

In a refinement, the top of the particle trap is convex.

In another refinement, each wing culminates in a tip; and the top of the particle trap is defined by a radius substantially larger than the distance between the tips.

In yet another refinement, the particle trap grounded to the tank.

In still another refinement, the particle trap is constructed to form a radiator to radiate heat to the SF6 in the tank.

In yet still another refinement, the circuit breaker further comprises a heater, wherein the radiator is thermally coupled to the heater via the wall, the heater being disposed adjacent the wall outside the tank, and the radiator being disposed on the wall inside the tank opposite the heater and being constructed to radiate heat received from the heater to the SF6 in the tank.

In a further refinement, the wing extends from the spar at least twice the distance that the wing is spaced apart from the wall.

In a yet further refinement, the width of the particle trap is at least three times the height of the particle trap.

In a still further refinement, the circuit breaker system further comprises a well formed in the bottom of the tank, wherein the particle trap s disposed in the well.

Embodiments of the present invention include a sulfur hexafluoride (SF6) insulated circuit breaker system, comprising: a tank constructed to hold a quantity of SF6; a circuit breaker having contacts insulated by the SF6; and combined means for radiating heat to the SF6 in the tank and for trapping particles at the bottom of the tank.

In a refinement, the tank includes a shell having a wall for containing the SF6, the circuit breaker system further comprising a heater disposed outside the tank, wherein the combined means is thermally coupled to the heater via the wall.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A sulfur hexafluoride (SF6) insulated circuit breaker system, comprising:
a tank constructed to hold a quantity of SF6, the tank having a wall for containing the SF6, the wall defining a shell having two ends and a length extending between the two ends;
a circuit breaker having contacts insulated by the SF6; and
an SF6 heating system having a heater extending lengthwise parallel to the length of the shell and a radiator thermally coupled to the heater via the wall, the heater being disposed on the wall outside the tank, and the radiator being disposed on the wall inside the tank and opposite the heater, wherein the heating system is constructed to conduct heat from the heater through the wall to the radiator; wherein the wall is disposed between the heater and the radiator, and defines a conduction path that conducts the heat from the heater to the radiator; and wherein the radiator is constructed to radiate heat, received from the heater by conduction along the conduction path, to the SF6 in the tank.

2. The circuit breaker system of claim 1, wherein the radiator is constructed to trap particles at a bottom of the tank.

3. The circuit breaker system of claim 2, wherein the radiator is in electrical communication with the tank and at a same potential as the tank.

4. The circuit breaker system of claim 2, the tank having two ends and a shell having a length extending between the two ends, wherein the radiator has a length corresponding substantially to the length of the shell.

5. A sulfur hexafluoride (SF6) insulated circuit breaker system, comprising:
a tank constructed to hold a quantity of SF6, the tank having a wall for containing the SF6;
a circuit breaker having contacts insulated by the SF6; and
an SF6 heating system having a heater and a radiator thermally coupled to the heater via the wall, the heater being disposed on the wall externally of the tank and the radiator being disposed on the wall inside the tank and opposite the heater, wherein the heating system is constructed to conduct heat from the heater through the wall to the radiator; and wherein the radiator is constructed to radiate heat received from the heater via the wall to the SF6 in the tank,
wherein the radiator is constructed to trap particles at a bottom of the tank; and
wherein the radiator has a spar extending radially inward from the wall, and a wing extending from each side of the spar, each wing being spaced apart from the wall and forming a region having no electric field at the bottom of the tank adjacent to the spar and between the wing and the wall.

6. The circuit breaker system of claim 5, wherein each wing culminates in a tip; wherein a top of the radiator is convex, and wherein the top of the radiator is defined by a radius substantially larger than a distance between the tips.

7. The circuit breaker system of claim 2, wherein the radiator is disposed in a well formed at the bottom of the tank.

8. The circuit breaker system of claim 1, wherein the radiator is formed of a nonmagnetic metallic material or a metallic material having a low magnetic permeability.

9. The circuit breaker system of claim 8, wherein the radiator is black anodized aluminum.

10. A sulfur hexafluoride (SF6) insulated circuit breaker system, comprising:
a tank constructed to hold a quantity of SF6, the tank having two ends and a shell having a length extending between the two ends, the shell having a wall for containing the SF6;
a circuit breaker having contacts insulated by the SF6; and
a particle trap mounted on the wall, the particle trap having a spar extending radially inward from the wall and a wing extending outward from each side of the spar, each wing being spaced apart from the wall and forming a region having no electric field at a bottom of the tank adjacent the spar, wherein the particle trap has a length corresponding substantially to the length of the shell; and wherein the particle trap is constructed to trap particles at the bottom of the tank to prevent flashover with the circuit breaker.

11. The circuit breaker system of claim 10, wherein a top of the particle trap is convex.

12. The circuit breaker system of claim 11, wherein each wing culminates in a tip; and wherein the top of the particle trap is defined by a radius substantially larger than a distance between the tips.

13. The circuit breaker system of claim 10, wherein the particle trap is grounded to the tank.

14. The circuit breaker system of claim 10, wherein the particle trap is constructed to form a radiator to radiate heat to the SF6 in the tank.

15. The circuit breaker system of claim 14, further comprising a heater, wherein the radiator is thermally coupled to the heater via the wall, the heater being disposed adjacent the wall outside the tank, and the radiator being disposed on the wall inside the tank opposite the heater and being constructed to radiate heat received from the heater to the SF6 in the tank.

16. The circuit breaker system of claim 10, wherein the wing extends from the spar at least twice a distance that the wing is spaced apart from the wall.

17. The circuit breaker system of claim 10, wherein a width of the particle trap is at least three times a height of the particle trap.

18. The circuit breaker system of claim 10, further comprising a well formed in the bottom of the tank, wherein the particle trap is disposed in the well.

19. A sulfur hexafluoride (SF6) insulated circuit breaker system, comprising:

a tank constructed to hold a quantity of SF6, the tank having a wall for containing the SF6;

a heater operative to supply heat for heating the SF6, wherein the heater is disposed outside the tank;

a circuit breaker having contacts insulated by the SF6; and combined means for radiating heat to the SF6 in the tank and means for trapping particles at a bottom of the tank, wherein the wall is disposed between the heater and the combined means for radiating heat and means for trapping particles, and separates the heater from the combined means for radiating heat and means for trapping particles; wherein the wall defines a conduction path that conducts the heat from the heater to the combined means for radiating heat and means for trapping particles; and wherein the combined means for radiating heat and means for trapping particles radiates heat, received from the heater by conduction along the conduction path, to the SF6 in the tank.

20. The circuit breaker system of claim 19, wherein the wall defines a shell having two ends and a length extending between the two ends; wherein the heater extends lengthwise parallel to the length of the shell; and wherein the combined means is thermally coupled to the heater via the wall.

* * * * *